United States Patent [19]

Shih et al.

[11] Patent Number: 5,286,826
[45] Date of Patent: Feb. 15, 1994

[54] PROCESS FOR MAKING HIGHLY CROSSLINKED POLYVINYLPYRROLIDONE HAVING A LOW SWELL VOLUME

[75] Inventors: Jenn S. Shih, Paramus, N.J.; Susan Y. Tseng, Staten Island, N.Y.

[73] Assignee: ISP Investments Inc., Wilmington, Del.

[21] Appl. No.: 26,649

[22] Filed: Mar. 5, 1993

[51] Int. Cl.$^5$ .................. C08F 226/10; C08F 2/10
[52] U.S. Cl. ........................ 526/264; 526/89
[58] Field of Search .................. 526/264, 89

[56] References Cited

U.S. PATENT DOCUMENTS 3,277,066 10/1966 Grosser et al. .................. 526/73
4,658,002 4/1987 Tschang et al. .................. 526/264

Primary Examiner—Joseph L. Schofer
Assistant Examiner—Wu C. Cheng
Attorney, Agent, or Firm—Walter Katz; Marilyn J. Maue; Joshua J. Ward

[57] ABSTRACT

A process for making highly crosslinked polyvinylpyrrolidone (PVP) polymer which has a low swell volume and is white in appearance comprising:

(a) heating a reaction mixture comprising vinylpyrrolidone (VP) monomer at a VP concentration of about 70–95%, preferably 75–85%, by weight, in an aqueous basic solution containing about a 0.3–1.5%, preferably a 0.4–0.8% basic content, at a reaction temperature of about 130°–170° C., preferably 135°–145° C., and under an inert gas atmosphere, for a period of time sufficient to generate a crosslinker in situ, (b) diluting the basic reaction solution with water to reduce the VP concentration to about 5–30%, preferably 15–25%, and (c) polymerizing the diluted reaction solution at a polymerization temperature of about 100° C. to provide a crosslinked PVP polymer having a swell volume of <45 ml/10 g.

4 Claims, No Drawings

PROCESS FOR MAKING HIGHLY CROSSLINKED POLYVINYLPYRROLIDONE HAVING A LOW SWELL VOLUME

FIELD OF THE INVENTION

This invention relates to highly crosslinked polyvinylpyrrolidone (PVP) polymer, and, more particularly, to a three-step process for preparing crosslinked PVP having a low swell volume and is white in appearance.

DESCRIPTION OF THE PRIOR ART

Highly crosslinked or insoluble PVP, known as crospovidone, has been made by popcorn or proliferous polymerization of vinylpyrrolidone, as described in U.S. Pat. Nos. 3,277,066; 3,306,886; 3,759,880; 3,933,766; and 3,992,562. In the process of U.S. Pat. Nos. 3,277,066 and 3,306,886, VP was placed in an autoclave and heated at an elevated temperature of about 140° C. in the presence of an aqueous caustic solution to generate a crosslinker intermediate in situ (stage 1), then cooled to about 100° C., and held at this lower temperature for a sufficient period of time, known as the "induction time", for onset of polymerization to occur (stage 2), and then continuing the polymerization step until complete polymerization has occurred (stage 3). However, the crosslinked PVP product obtained has a high swell volume.

In U.S. Pat. Nos. 3,759,880; 3,933,766; and 3,992,562, VP was polymerized to crosslinked PVP by heating an aqueous solution of VP at 100° C. in the presence of an added bifunctional crosslinking agent.

Accordingly, it is an object of this invention to provide a process for making highly crosslinked polyvinylpyrrolidone having a low swell volume by popcorn polymerization of vinylpyrrolidone.

SUMMARY OF THE INVENTION

A process for making highly crosslinked polyvinylpyrrolidone (PVP) polymer which has a low swell volume and is white in appearance comprising:

(a) heating a reaction mixture comprising vinylpyrrolidone (VP) monomer at a VP concentration of about 70-95%, preferably 75-85%, by weight, in an aqueous basic solution containing about a 0.3-1.5%, preferably a 0.4-0.8% basic content, at a reaction temperature of about 130°-170° C., preferably 135°-145° C., and under an inert gas atmosphere, for a period of time sufficient to generate a crosslinker in situ, (b) diluting the basic reaction solution with water to reduce the VP concentration to about 5-30%, preferably 15-25%, and (c) polymerizing the diluted reaction solution at a polymerization temperature of about 100° C. to provide a crosslinked PVP polymer having a swell volume of <45 ml/10 g.

DETAILED DESCRIPTION OF THE INVENTION

The 3-step process of the present invention commences with step (a) in which a reaction mixture of vinylpyrrolidone (VP) at a concentration of about 70-95%, preferably 75-85%, by weight, in an aqueous strongly basic solution, such as a caustic solution, e.g. NaOH or KOH, or a tetraalkylammonium hydroxide, e.g. tetramethylammonium hydroxide, at a base content of about 0.3-1.5%, preferably 0.4-0.8%, is heated in an inert gas atmosphere at a reaction temperature of about 130°-170° C., preferably 135°-145° C., at an initial gas pressure of about 0-3 bars of the inert gas, and for a period of time sufficient to generate a crosslinker in situ.

At this point in the process, in step (b), the basic reaction solution is diluted with water to reduce the VP concentration to about 5-30%, preferably 15-25%. Thereafter, in step (c), the diluted reaction solution is polymerized at about 100° C. to provide a crosslinked PVP polymer having a swell volume of <45 ml/10 g. which is white in appearance.

The invention will now be more fully described with reference to the following examples.

EXAMPLES 1-7

A 2-liter Parr high pressure reactor equipped with a turbine agitator, a nitrogen purge adaptor, a thermocouple with temperature controller and a cooling coil was charged with 200 parts of VP, 50.9 parts of deionized water, and 5.3 parts of caustic soda 20 (20% NaOH solution). The reaction system was purged to 30 psi and vented to 1 psi, and repeated three times. Then the reactants were heated from ambient temperature to 140° C. in 30 minutes, and held at this temperature for 4.5 hours. The reactor then was cooled to about 35° C. and a predetermined amount of deionized water was added to form a diluted reaction solution (see Table below). Thereafter, the reactor was reheated to 100° C. within 30 minutes and held there for 5 hours. The resultant solution was cooled and transferred to a glass kettle equipped with nitrogen purge tube, condenser and thermocouple connected to the temperature controller. The solution was then heated to 100° C. with nitrogen purge until the onset of popcorn polymerization. The polymerization reaction mixture then was kept at 100° C. for another 2 to 3 hours, cooled, filtered and the product was washed until the pH of the filtrate was 7.0. The precipitate was dried in a vacuum oven at 70° C. for overnight. The results are shown in the Table below.

TABLE

| Example | Dilution Water (parts) | Diluted Reaction Solution % VP (% Solids) | Polymer Yield (%) | Polymer Swell Volume (SV) (ml/10 g) | Polymer Appearance |
|---|---|---|---|---|---|
| 1 | 800 | 19 | 82 | 33 | white |
| 2 | 1600 | 10.8 | 88 | 41 | white |
| 3 | 1000 | 16 | 77 | 40 | white |
| 4 | 800 | 19 | 77 | 37 | white |
| 5 | 800 | 19 | — | 37 | white |
| 6 | 800 | 19 | 93 | 44 | white |
| 7 | 800 | 19 | — | 39 | white |

EXAMPLE 8

Example 1 was repeated with the additional step of adjusting the pH of the diluted reaction solution to a pH of 9.5 by adding concentrated HCl to the solution. The yield of the polymer was 80%, the swell volume of the polymer was 40 ml/10 g, and it was white in appearance.

EXAMPLE 9

Example 2 was repeated with the additional step of adding 1.0 parts of divinylimidazolidone to the diluted reaction solution. The swell volume of the polymer obtained was 36 ml/10 g and it was white in appearance.

What is claimed is:

1. A process for making highly crosslinked polyvinylpyrrolidone (PVP) polymer having a low swell volume and is white in appearance which comprises:
   (a) heating a reaction mixture comprising vinylpyrrolidone (VP) monomer at a VP concentration of about 70–95%, by weight, in an aqueous strongly basic solution containing about a 0.3–1.5% base content, at a reaction temperature of 130°–170° C. and under an inert gas atmosphere, for a period of time sufficient to generate a crosslinker in situ,
   (b) diluting the basic reaction solution with water to form a diluted reaction solution in which the VP concentration is about 5–30%, and
   (c) polymerizing the diluted reaction solution at a polymerization temperature of about 100° C. to form a crosslinked PVP polymer having swell volume of <45 ml/10 g. and is white in appearance.

2. A process according to claim 1 wherein, in (a), the VP concentration is 75–85%, and the base content is about 0.4–0.8%, the reaction temperature is about 135°–145° C., and the period of time is about 0.5–10 hours.

3. A process according to claim 1 wherein, in (b), the VP concentration of the diluted reaction solution is about 15–25%.

4. A process according to claim 1 wherein step (a) is carried out for a period of about 2–5 hours.

* * * * *